(12) United States Patent
Lee et al.

(10) Patent No.: US 9,867,156 B2
(45) Date of Patent: Jan. 9, 2018

(54) METHOD AND APPARATUS FOR SYNCHRONIZATION IN D2D COMMUNICATION NETWORK

(71) Applicant: ELECTRONICS AND TELECOMMUNICATIONS RESEARCH INSTITUTE, Daejeon (KR)

(72) Inventors: Changhee Lee, Seoul (KR); Wooram Shin, Daejeon (KR); Sung-Min Oh, Daejeon (KR); Ae-Soon Park, Daejeon (KR); Jeong Hwan Lee, Hwaseong-Si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 187 days.

(21) Appl. No.: 14/820,551

(22) Filed: Aug. 6, 2015

(65) Prior Publication Data

US 2016/0044616 A1    Feb. 11, 2016

(30) Foreign Application Priority Data

Aug. 7, 2014  (KR) .......................... 10-2014-0101925
Jan. 9, 2015  (KR) .......................... 10-2015-0003574
Aug. 5, 2015  (KR) .......................... 10-2015-0110762

(51) Int. Cl.
*H04W 56/00* (2009.01)
*H04L 27/26* (2006.01)
(Continued)

(52) U.S. Cl.
CPC ....... *H04W 56/004* (2013.01); *H04L 27/2678* (2013.01); *H04W 56/0095* (2013.01); *H04W 76/023* (2013.01); *H04W 88/04* (2013.01)

(58) Field of Classification Search
None
See application file for complete search history.

(56) References Cited

U.S. PATENT DOCUMENTS 8,848,700 B2 *  9/2014  Ahn ...................... H04W 72/04
                                                      370/252
9,596,668 B2 *  3/2017  Yoon ................. H04W 56/0015
(Continued)

FOREIGN PATENT DOCUMENTS

KR    10-2013-0046298 A    5/2013
KR    10-2014-0084839 A    7/2014

*Primary Examiner* — Ayaz Sheikh
*Assistant Examiner* — Faiyazkhan Ghafoerkhan
(74) *Attorney, Agent, or Firm* — Rabin & Berdo, P.C.

(57) ABSTRACT

A method for synchronization by a D2D terminal in a D2D communication network through receiving a first D2D synchronization signal from at least one D2D synchronization source and performing synchronization according to a synchronization timing reference provided through the first D2D synchronization signal, and a method for negotiating whether to perform a role as a synchronization source with another D2D synchronization source through determining, when a D2D synchronization signal and a D2D synchronization channel are received from at least one D2D synchronization source, whether to maintain a role as the independent synchronization source based on negotiation information for negotiation between synchronization sources included in the D2D synchronization channel, and operating as a relaying synchronization source when the role as the independent synchronization source is not maintained, are provided.

7 Claims, 9 Drawing Sheets

(51) Int. Cl.
    *H04W 88/04*     (2009.01)
    *H04W 76/02*     (2009.01)

(56) References Cited

U.S. PATENT DOCUMENTS

| | | | |
|---|---|---|---|
| 2013/0108000 A1* | 5/2013 | Park | H04J 3/0676 375/362 |
| 2014/0211781 A1* | 7/2014 | Kim | H04W 56/0025 370/350 |
| 2015/0296469 A1* | 10/2015 | Yoon | H04W 76/023 370/350 |
| 2015/0327195 A1* | 11/2015 | Chiu | H04W 56/002 370/350 |
| 2016/0345279 A1* | 11/2016 | Gunnarsson | H04W 4/005 |

* cited by examiner

Negotiation

METHOD AND APPARATUS FOR SYNCHRONIZATION IN D2D COMMUNICATION NETWORK

CROSS-REFERENCE TO RELATED APPLICATION

This application claims priority to and the benefit of Korean Patent Application Nos. 10-2014-0101925, 10-2015-0003574 and 10-2015-0110762 filed in the Korean Intellectual Property Office on Aug. 7, 2014, Jan. 9, 2015 and Aug. 5, 2015, the entire contents of which are incorporated herein by reference.

BACKGROUND OF THE INVENTION (a) Field of the Invention

The present invention relates to a method for synchronization of a D2D terminal with another D2D terminal in a D2D communication network.

(b) Description of the Related Art

In a long term evolution (LTE) mobile communication system, research for supporting device to device (D2D) communication is in progress. In the D2D communication, a terminal may directly transmit and receive data to and from a contiguous terminal without passing through a base station. In LTE D2D which is discussed in a 3GPP standard commission, a method is discussed in which a D2D terminal provides synchronization in order to support the D2D communication, and some of D2D terminals may operate as a D2D synchronization source according to a determined agreement. The D2D synchronization source transmits a D2D synchronization signal (D2DSS) for matching synchronization and a physical D2D synchronization channel (PD2DSCH) for transferring additional information for the synchronization to provide a synchronization timing reference to a contiguous D2D terminal. The D2D terminal that receives the D2D synchronization signal and the D2D synchronization channel from a contiguous D2D synchronization source configures the synchronization timing reference based on information included in the received D2D synchronization signal and D2D synchronization channel.

A method for the terminal supporting the D2D communication to match the synchronization with the contiguous D2D terminal may vary depending on whether the D2D terminal is controlled by the base station. When the D2D terminal is directly controlled from the base station, the D2D terminal may receive a downlink synchronization timing reference of the base station through synchronization signals (e.g., a primary synchronization signal and a secondary synchronization signal) transmitted by the base station. Further, in order to provide synchronization timing to the contiguous D2D terminal, the base station commands a specific D2D terminal to operate as the D2D synchronization source.

SUMMARY OF THE INVENTION

The present invention has been made in an effort to provide a method and an apparatus for transferring synchronization information to a contiguous D2D terminal and synchronization with the contiguous D2D terminal when a D2D terminal is not able to be controlled by a base station.

An exemplary embodiment of the present invention provides a method for synchronization by a device to device (D2D) terminal performing D2D communication The synchronization method includes: receiving a first D2D synchronization signal from at least one D2D synchronization source; and performing synchronization according to a synchronization timing reference provided through the first D2D synchronization signal.

The synchronization method may further include: receiving a first D2D synchronization channel from at least one D2D synchronization source; and adjusting the synchronization timing reference based on delay information regarding a propagation delay, which is included in the D2D synchronization channel.

The delay information may be a bitstream determined with a predetermined length based on a type of a cyclic prefix (CP) supported in the D2D communication and a synchronization control interval.

The synchronization method may further include broadcasting a second D2D synchronization signal according to the adjusted synchronization timing reference.

The synchronization method may further include broadcasting information regarding a second stratum level increased from a first stratum level included in the first D2D synchronization channel by 1 through a second D2D synchronization channel.

The adjusting may include adjusting the synchronization timing reference so that an accumulation time of the propagation delay is not longer than the cyclic prefix (CP) supported in the D2D communication.

The synchronizing may include estimating the propagation delay based on reception strength of the first D2D synchronization signal, and adjusting the synchronization timing reference provided through the first D2D synchronization signal based on the estimated propagation delay.

Another exemplary embodiment of the present invention provides a method for synchronization by a device to device (D2D) terminal performing D2D communication. The synchronization method includes: receiving a first D2D synchronization signal from at least one D2D synchronization source; estimating a round-trip delay (RTD) from at least one D2D synchronization source based on the first D2D synchronization signal; and transmitting a D2D synchronization channel including delay information configured based on the RTD.

The synchronization method may further include transmitting a second D2D synchronization signal to at least one D2D synchronization source, wherein the first D2D synchronization signal is a synchronization signal generated based on a synchronization timing reference of the second D2D synchronization signal.

Yet another exemplary embodiment of the present invention provides a method for synchronization source negotiation by an independent synchronization source included in a device to device (D2D) communication network. The method for synchronization source negotiation includes: determining, when a D2D synchronization signal and a D2D synchronization channel are received from at least one D2D synchronization source, whether to maintain a role as the independent synchronization source based on negotiation information for negotiation between synchronization sources included in the D2D synchronization channel; and operating as a relaying synchronization source when the role as the independent synchronization source is not maintained.

The negotiation information may include a negotiation number which the independent synchronization source determines when selecting the role as the independent synchronization source.

The determining may include comparing the negotiation number of the independent synchronization source and a negotiation number of at least one D2D synchronization source, and determining whether to maintain the role as the independent synchronization source based on the comparison result.

The negotiation information may include a time stamp indicating a period when the independent synchronization source operates as the independent synchronization source.

The determining may include comparing the time stamp of the independent synchronization source and a time stamp of at least one D2D synchronization source, and determining whether to maintain the role as the independent synchronization source based on the comparison result.

The method for synchronization source negotiation may further include increasing a stratum level by 1 when the role as the independent synchronization source is not maintained.

The determining may include verifying a stratum level of at least one D2D synchronization source, and determining whether to maintain the role as the independent synchronization source when the stratum level of at least one D2D synchronization source is 0 or 1.

The determining may further include maintaining the role as the independent synchronization source when the stratum level of at least one D2D synchronization source is 2 or more.

According to an embodiment of the present invention, a D2D terminal can perform synchronization with a contiguous D2D terminal through a hierarchical structure without control by a base station outside coverage of the base station. In this case, the D2D terminal according to the embodiment of the present invention can avoid a possible signal collision or signal interference due to a propagation delay by adjusting a synchronization timing reference. Further, the D2D terminal appropriately controls the number of independent synchronization sources through negotiation with another synchronization source to solve a problem of an increase in battery consumption and calculation complexity of the D2D terminal.

DETAILED DESCRIPTION OF THE EMBODIMENTS

Figure 1:
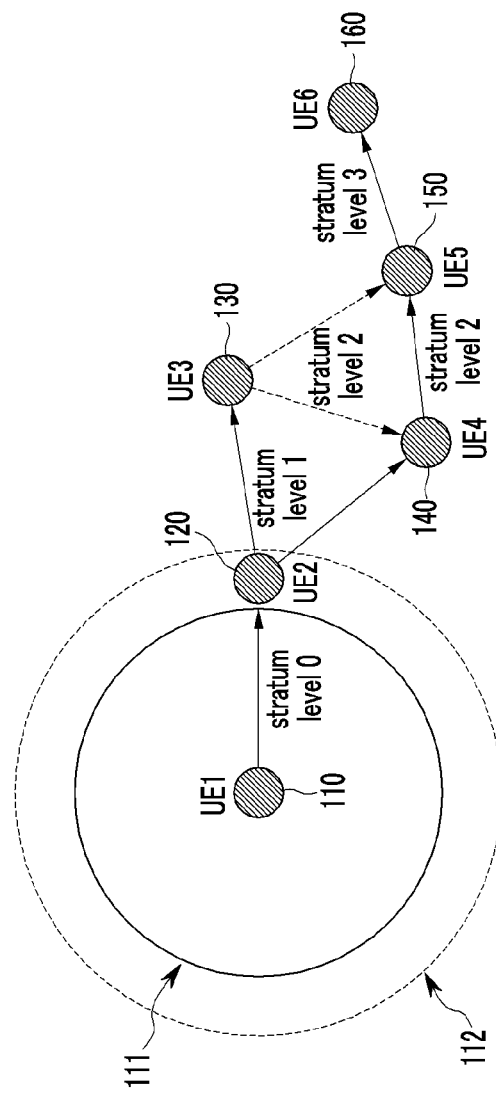
FIG. 1 is a diagram illustrating topology of a D2D communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be designated as a mobile station (MS), a mobile terminal (MT), an advanced mobile station (AMS), a high reliability mobile station (HR-MS), a subscriber station (SS), a portable subscriber station (PSS), an access terminal (AT), user equipment (UE), and the like, and may include all or some of the MT, the MS, the AMS, the HR-MS, the SS, the PSS, the AT, the UE, and the like.

Further, a base station (BS) may be designated as an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small-sized base stations [femto BS, a home node B (HNB), a home eNodeB (HeNB), a pico BS, a macro BS, a micro BS, and the like], and the like, and may include all or some functions of the ABS, the NodeB, the eNodeB, the AP, the RAS, the BTS, the MMR-BS, the RS, the RN, the ARS, the HR-RS, the small-sized base stations, and the like.

FIG. 1 is a diagram illustrating topology of a D2D communication network according to an exemplary embodiment of the present invention.

When a D2D terminal receives a downlink synchronization signal from a base station or a D2D synchronization signal or a D2D synchronization channel from a contiguous D2D synchronization source, the D2D terminal may obtain a synchronization timing reference through the received synchronization signal.

When the D2D terminal directly receives the synchronization timing reference, the D2D terminal may obtain the synchronization timing reference through a synchronization signal (e.g., a primary synchronization signal and a secondary synchronization signal) broadcasted by the base station. In this case, the quality of the synchronization signal provided by the base station may be equal to or more than a threshold value of a predetermined size.

When the D2D terminal receives the synchronization timing reference from the contiguous D2D synchronization source, the D2D terminal may obtain the synchronization timing reference through the D2D synchronization signal and the D2D synchronization channel transmitted from the contiguous D2D synchronization source. In this case, the synchronization timing reference may be directly provided to the D2D synchronization source through the synchronization signal of the base station and provided from the contiguous D2D synchronization source to which the synchronization timing reference of the base station is applied. In this case, the D2D terminal indirectly obtains the synchronization timing reference of the base station.

Alternatively, the synchronization timing reference provided to the D2D synchronization source may be directly provided from an independent synchronization source or provided from another D2D synchronization source receiving the synchronization timing reference from the independent synchronization source. In this case, the D2D terminal directly or indirectly obtains the independent synchronization source.

When the D2D terminal is controlled by the base station or the D2D synchronization signal and the D2D synchronization channel are received from another D2D terminal to which the base station provides the synchronization timing reference, the D2D terminal may obtain a common synchronization timing reference provided from the base station. However, when the D2D terminal does not receive the synchronization timing reference of the base station, the D2D terminal may apply the synchronization timing reference provided from the independent synchronization source. The D2D terminal according to the exemplary embodiment of the present invention may have a priority for the synchronization timing reference as follows.

First, the D2D synchronization signal provided from the base station has a highest priority.

The D2D synchronization signal of the base station, which is indirectly received, has a higher priority than the D2D synchronization signal provided from the independent synchronization source. That is, when a source of the synchronization timing reference is the base station, a priority of the D2D synchronization signal including information on the synchronization timing reference is higher.

In the case where only the D2D synchronization signal received from the independent synchronization source is present, a synchronization timing reference of D2D communication for public safety has a higher priority than a case other than that. In addition, when the D2D synchronization channel includes information on the number of hops or a stratum level, a synchronization signal transmitted from a D2D synchronization source which is lower in the number of hops or the stratum level has the higher priority.

Last, when priorities of at least two synchronization signals are the same as each other, a signal having a larger received power has the higher priority.

In the D2D communication network according to the exemplary embodiment of the present invention, when both D2D communication for the public safety and D2D communication for transmitting and exchanging data between terminals other than for public safety are supported, the D2D communication for the public safety has a higher priority than D2D communication for a purpose other than the public safety. Accordingly, when the D2D terminal configures the synchronization timing reference, the priority for the D2D synchronization signal of the D2D communication for the public safety may be set to be highest.

The D2D terminal needs to distinguish the D2D synchronization signal for the public safety and the D2D synchronization signal of the D2D communication other than that in order to apply the high priority to the D2D synchronization signal for the public safety. According to the exemplary embodiment of the present invention, a sequence of the D2D synchronization signal for the public safety and a sequence of the D2D synchronization signal other than that may be divided into groups in order to distinguish the D2D synchronization signal for the public safety with the D2D synchronization signal for other than public safety. Alternatively, it may be represented that the D2D synchronization signal is used for the public safety through the information in the D2D synchronization channel.

In a method in which the sequence of the D2D synchronization signal for the public safety and the sequence of the D2D synchronization signal other than that are divided into the groups, some sequences of all sequences which may be used as the D2D synchronization signal may be designated for the D2D synchronization signal for the public safety. Therefore, when the D2D terminal that receives the D2D synchronization signal accurately receives the D2D synchronization signal, the D2D terminal may determine whether the synchronization timing reference is used in the D2D communication for the public safety through the received D2D synchronization signal or whether the synchronization timing reference is used in data communication with another D2D terminal.

In a method for notifying a purpose of the D2D synchronization signal through the D2D synchronization channel, an indicator (e.g., a public safety indicator) indicating the purpose of the D2D synchronization signal or a distinguisher capable of distinguishing the D2D communication for the public safety and the D2D communication other than that may be included in the D2D synchronization channel. In this case, the indicator and the distinguisher may be configured by the small number of bits. For example, when the D2D synchronization source provides the synchronization timing reference of the D2D communication for the public safety, the public safety distinguisher included in the D2D synchronization channel may be set to 1, and when the D2D synchronization source provides the synchronization timing reference of the D2D communication other than that, the public safety distinguisher may be set to 0. Thereafter, the D2D terminal that receives the D2D synchronization channel may know a use purpose (the purpose for the public safety or other purpose) of the synchronization timing reference provided through the public safety distinguisher.

When the D2D terminal does not receive the downlink synchronization signal of the base station or the D2D synchronization signal from the contiguous D2D synchronization source, the D2D terminal may operate as the independent synchronization source (I-SS) under a predetermined condition in order to provide the synchronization timing reference to another contiguous D2D terminal. The independent synchronization source may determine the synchronization timing reference and broadcast the determined synchronization timing reference to the contiguous D2D terminal. In this case, the synchronization timing reference determined by the independent synchronization source may be provided to the independent synchronization source through a timer or a global positioning system (GPS) in the terminal. In the exemplary embodiment of the present invention, when the D2D terminal does not receive the synchronization signal (the downlink synchronization signal of the base station or the D2D synchronization signal and the D2D synchronization channel) from of the base station or the contiguous D2D synchronization source, the D2D terminal may operate as the independent synchronization source in the case where the strength of the provided synchronization signal may not satisfy a specific threshold value for guaranteeing the quality of the synchronization timing reference or in the case where a minimum value of the number of difference synchronization timing references required to stably provide the synchronization timing reference may not be satisfied.

The D2D terminal that receives the synchronization timing reference from the independent synchronization source may transfer the synchronization timing reference thereof to a lower D2D terminal thereof through the D2D synchronization signal and the D2D synchronization channel. In this case, the D2D terminal operates as a relaying synchronization source (R-SS). The relaying synchronization source may transfer the synchronization timing reference provided from an upper independent synchronization source (the independent synchronization source or a contiguous relaying synchronization source) to the contiguous D2D terminal through a D2D synchronization signal or a D2D synchronization channel generated thereby.

According to a hierarchical synchronization procedure according to an exemplary embodiment of the present invention, the relaying synchronization source may transfer the synchronization timing reference received from the upper D2D synchronization source to the lower D2D terminal through the D2D synchronization signal and the D2D synchronization channel. The D2D synchronization signal and the D2D synchronization channel may be transmitted in at least one resource pool designated for the D2D synchronization signal and the D2D synchronization channel, and each resource pool may have a predetermined cycle. When the D2D terminal that operates as the relaying synchronization source receives the D2D synchronization signal and the D2D synchronization channel from one D2D synchronization resource pool, the D2D terminal arbitrarily selects one of the remaining D2D synchronization resource pools to transmit the D2D synchronization signal and the D2D synchronization channel generated thereby. For example, when the number of the D2D synchronization resource pools is 2, the relaying synchronization source may receive the D2D synchronization signal and the D2D synchronization channel from one resource pool of two available resource pools and transmit the D2D synchronization signal and the D2D synchronization channel thereof through the remaining resource pool. The relaying synchronization source may determine the synchronization timing reference through the D2D synchronization signal provided from the upper D2D synchronization source according to priorities of an operating reference as the synchronization timing reference described above and the synchronization timing reference, and transmit the D2D synchronization signal and the D2D synchronization channel. A method in which the relaying synchronization source transmits the D2D synchronization signal and the D2D synchronization channel will be described below.

First, the relaying synchronization source may transmit the same D2D synchronization signal (that is, the same sequence) as the D2D synchronization signal provided from the upper D2D synchronization source. In this case, the same D2D synchronization signal is a synchronization timing reference provided from the same D2D synchronization source. For example, the D2D terminal may receive an n-th D2D synchronization signal from the upper D2D synchronization source, and when the D2D terminal operates as the relaying synchronization source, the D2D terminal may transmit the n-th D2D synchronization signal which is the same as the provided synchronization signal. In addition, the D2D terminal may verify a synchronization group to which the D2D terminal belongs through the received D2D synchronization signal. When a sequence distinguished for each specific group (the public safety or not, inside/outside the coverage of the base station, and the like) is used as the D2D synchronization signal, the D2D terminal that receives the D2D synchronization signal receives the D2D synchronization signal to additionally receive information (hereinafter referred to as 'group information') regarding the synchronization group, or the like.

Meanwhile, the relaying synchronization source may transmit the D2D synchronization signal different from the D2D synchronization signal provided from the upper D2D synchronization source. In this case, the relaying synchronization source may arbitrarily select one of remaining selectable D2D synchronization signals other than the D2D synchronization signal which may be received from the D2D synchronization source contiguous to the D2D synchronization signal providing the synchronization timing reference, and transmit the selected D2D synchronization signal. Since the sequence used for the D2D synchronization signal has orthogonality and different D2D synchronization sources use maximally different sequences as the D2D synchronization signal, a probability that a D2D terminal which is not yet synchronized will successfully receive the D2D synchronization signal transmitted from the contiguous D2D synchronization source may increase. In order to additionally provide the information (group information) regarding the group providing the synchronization timing reference of the D2D synchronization signal, the sequence of the D2D synchronization signal may be classified for each predetermined group or the group information may be included in the D2D synchronization channel.

As the synchronization timing reference provided to the relaying synchronization source is transmitted to the contiguous D2D terminal, a propagation delay, multi-path fading, a processing delay of the D2D terminal, and the like may be accumulated in the synchronization timing reference, and an error due to the misalignment of the synchronization timing reference may increase as the delay accumulates. In the exemplary embodiment of the present invention, the stratum level may be used to decrease a time error which may occur as the number of hops to which the synchronization timing reference is transferred increases. For example, one synchronization source according to the exemplary embodiment of the present invention may transmit a D2D synchronization channel including the stratum level. One D2D synchronization source obtains the synchronization timing reference through the D2D synchronization signal and the D2D synchronization channel provided from the upper D2D synchronization source, and generates the D2D synchronization signal and the D2D synchronization channel to transmit the generated D2D synchronization signal and D2D synchronization channel to the contiguous D2D terminal. In this case, a value of the stratum level included in the D2D synchronization channel of the D2D synchronization source increases. The stratum level is information for transferring information on the number of hops and may be included in the D2D synchronization channel. Whenever the D2D synchronization signal for D2D synchronization passes through one hop, the value of the stratum level may increase one by one. In the D2D synchronization channel broadcasted from the independent synchronization source, the stratum level is set to 0. Since the time error is small due to the accumulation delays as the value of the stratum level is small, when the D2D terminal selects the synchronization timing reference, the value of the stratum level has a higher priority than the strength (a strength equal to or more than a threshold value indicating a reference to normally receive the D2D synchronization signal) of the D2D synchronization signal. In addition, when the D2D terminal receives the synchronization timing reference from a plurality of upper D2D synchronization sources, the stratum level of the D2D synchronization source providing the synchronization timing reference is lower, and the priority of the synchronization timing reference may be higher. When the synchronization timing reference is received from a plurality of D2D synchronization sources at the same stratum level, the D2D terminal may be synchronized according to the synchronization timing reference of the D2D synchronization source providing the D2D synchronization signal having larger received signal strength.

Referring to FIG. 1, a UE1 110 is the independent synchronization source and the stratum level of the UE1 110 is 0. A UE2 120, a UE3 130, a UE4 140, and a UE5 150 are the relaying synchronization sources, and the stratum level of the UE2 120 is 1, the stratum levels of the UE3 130 and the UE4 140 are 2, and the stratum level of the UE5 150 is 3. The stratum level of a UE6 160 is 4. A solid line 111 between two concentric circles illustrated around the UE1 110 represents a range in which a signal transmitted from the UE1 110 is received at a received signal strength, X [dBm], and a dotted line 112 represents an available range in which a synchronization timing reference of the UE1 110 may be obtained.

The UE4 140 may receive the D2D synchronization signal and the D2D synchronization channel from the UE2 120 having the stratum level of 1 and the UE3 130 having the stratum level of 2. In this case, the UE4 140 may perform synchronization according to the synchronization timing reference received from the UE2 120 having the lower stratum level. The UE5 150 receives the D2D synchronization signal and the D2D synchronization channel from the UE3 130 and the UE4 140 at the same level thereof, and in this case, the UE5 150 may configure synchronization thereof according to the synchronization timing reference of the UE4 140 providing the D2D synchronization signal having the larger strength.

Figure 2:
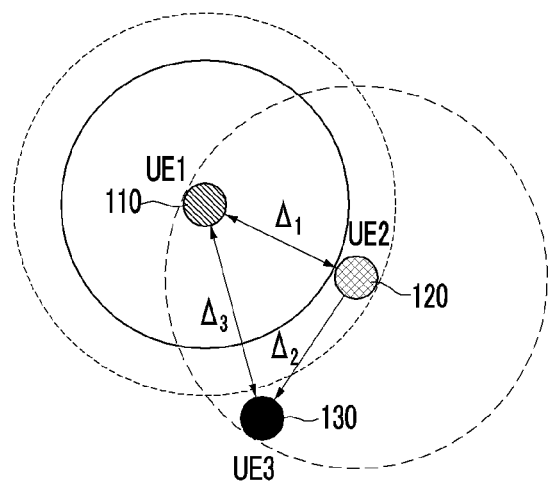
FIG. 2 is a diagram illustrating topology of a D2D communication network according to another exemplary embodiment of the present invention.
Figure 3:
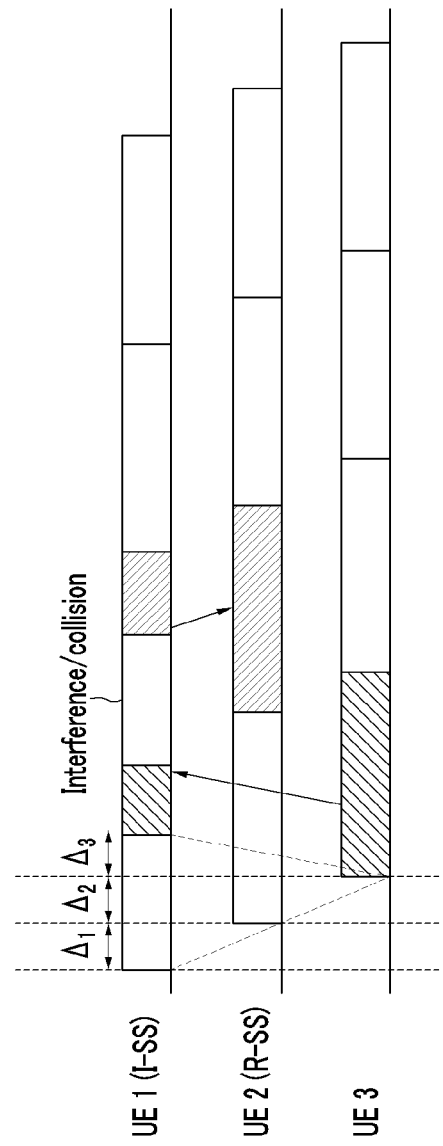
FIG. 3 is a diagram illustrating interference and a collision of D2D data according to another exemplary embodiment of the present invention.

FIG. 2 is a diagram illustrating topology of a D2D communication network according to another exemplary embodiment of the present invention, and FIG. 3 is a diagram illustrating interference and a collision of D2D data according to another exemplary embodiment of the present invention.

Referring to FIG. 2, when the D2D terminal performs synchronization through the hierarchical structure according to the exemplary embodiment of the present invention, as the D2D synchronization signal is transferred through the hop, the propagation delay and the multi-path fading are accumulated, and as a result, an error of the synchronization time may occur. That is, a synchronization time error between D2D terminals which synchronize with an independent synchronization source providing one synchronization timing reference may increase, and as a result, interference and a collision may occur during transmission of D2D data between the D2D terminals. In particular, when the sum of the accumulated delays is longer than the length of a cyclic prefix (CP) supported in D2D communication, the D2D terminal may not normally receive the interfered or collided data.

Referring to FIGS. 2 and 3, when the UE1 110 is the independent synchronization source and the UE2 120 is the relaying synchronization source, a synchronization time difference between the UE3 130 and the UE1 110 is shown in Equation 1 given below.

$$\Delta_1 + \Delta_2 \quad \text{(Equation 1)}$$

In this case, $\Delta_1$ represents a propagation delay between the UE1 110 and the UE2 120, and $\Delta_2$ represents a propagation delay between the UE2 120 and the UE3 130. In the exemplary embodiment of the present invention, a signal transmitted from the UE3 130 to the UE1 110 may reach the UE1 110 postponed by $\Delta_1 + \Delta_2 + \Delta_3$ due to a propagation delay 4 between the UE3 130 and the UE1 110.

The D2D synchronization source according to the exemplary embodiment of the present invention appropriately controls the synchronization timing reference to solve a signal interference or signal collision problem which may be result from the error in the misalignment of the synchronization reference. For example, the D2D synchronization source according to the exemplary embodiment of the present invention may control the synchronization timing reference so that an accumulation time of the propagation delay and the multi-path fading by an increase in the number of hops (alternatively, the stratum level) is not longer than the time length of the CP. In this case, the D2D synchronization source configures the timing reference based on a D2D synchronization signal of an higher layer which is received, and reflects information (hereinafter referred to as 'delay information') on the accumulated propagation delays when transmitting the D2D synchronization signal to adjust the synchronization timing reference. The D2D synchronization source may make the delay information be included in the D2D synchronization channel or provide the delay information for adjusting the synchronization signal by estimating a delay through a received strength of the D2D synchronization signal to another terminal. In this case, concepts of the higher layer and the lower layer are used for describing a process of transferring the synchronization timing reference provided from the contiguous D2D synchronization source, and when the stratum level is not applied, a priority of the timing synchronization reference between a transmission terminal and a reception terminal may not be present.

Figure 4:
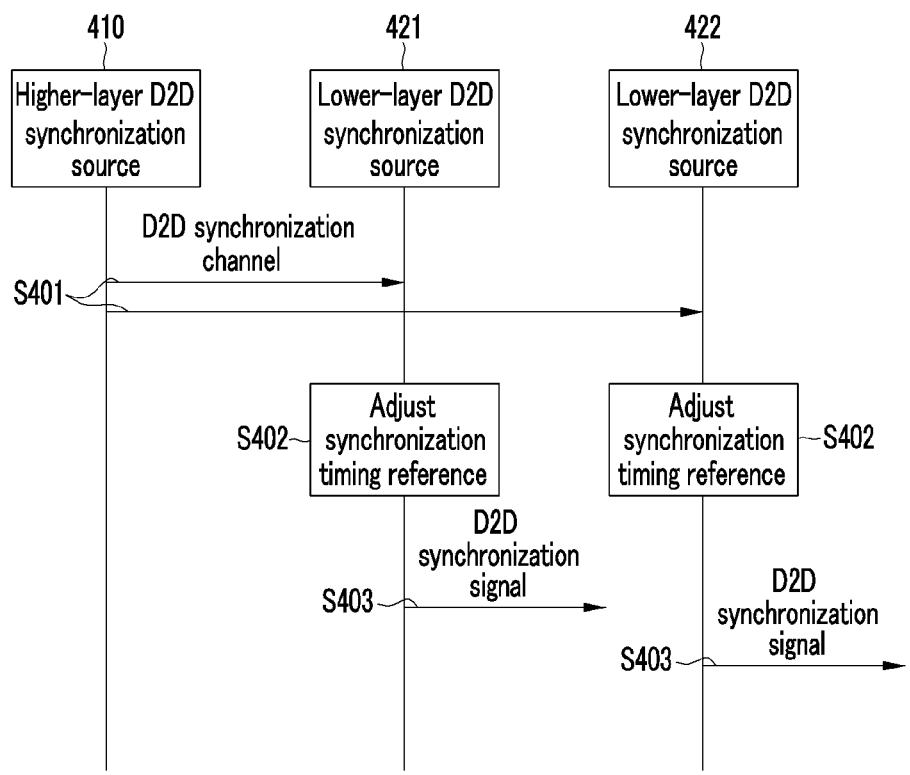
FIG. 4 is a flowchart illustrating a method for transmitting a synchronization signal according to an exemplary embodiment of the present invention.

FIG. 4 is a flowchart illustrating a method for transmitting a synchronization signal according to an exemplary embodiment of the present invention.

Referring to FIG. 4, a method in which the D2D synchronization source provides the delay information to the D2D synchronization source of the lower layer through the D2D synchronization channel is illustrated.

First, a D2D synchronization source 410 of the higher layer transmits the delay information to the D2D synchronization channel together when transmitting the D2D synchronization signal (S401). In this case, the delay information included in the D2D synchronization channel may be determined as a bitstream having a predetermined length based on a transmission strength of the D2D synchronization signal, a type (e.g., normal or extended) of the CP, and a synchronization control interval. The D2D synchronization source of the higher layer may be the independent synchronization source or the relaying synchronization source.

Thereafter, D2D synchronization sources 421 and 422 of the lower layer may configure the synchronization timing reference by using the D2D synchronization signal received from the D2D synchronization source 410 of the higher layer, and adjust the synchronization timing reference by using the delay information included in the D2D synchronization channel (S402). That is, the D2D synchronization sources 421 and 422 may configure the synchronization timing reference through the D2D synchronization signal provided from the source configured through the D2D synchronization signal based on the delay information included in the D2D synchronization channel, and adjust the configured synchronization timing reference based on the delay information included in the D2D synchronization channel.

Hereinafter, the D2D synchronization sources 421 and 422 of the lower layer broadcast the D2D synchronization signal to provide the adjusted synchronization timing reference to a contiguous D2D terminal (S403).

Figure 5:
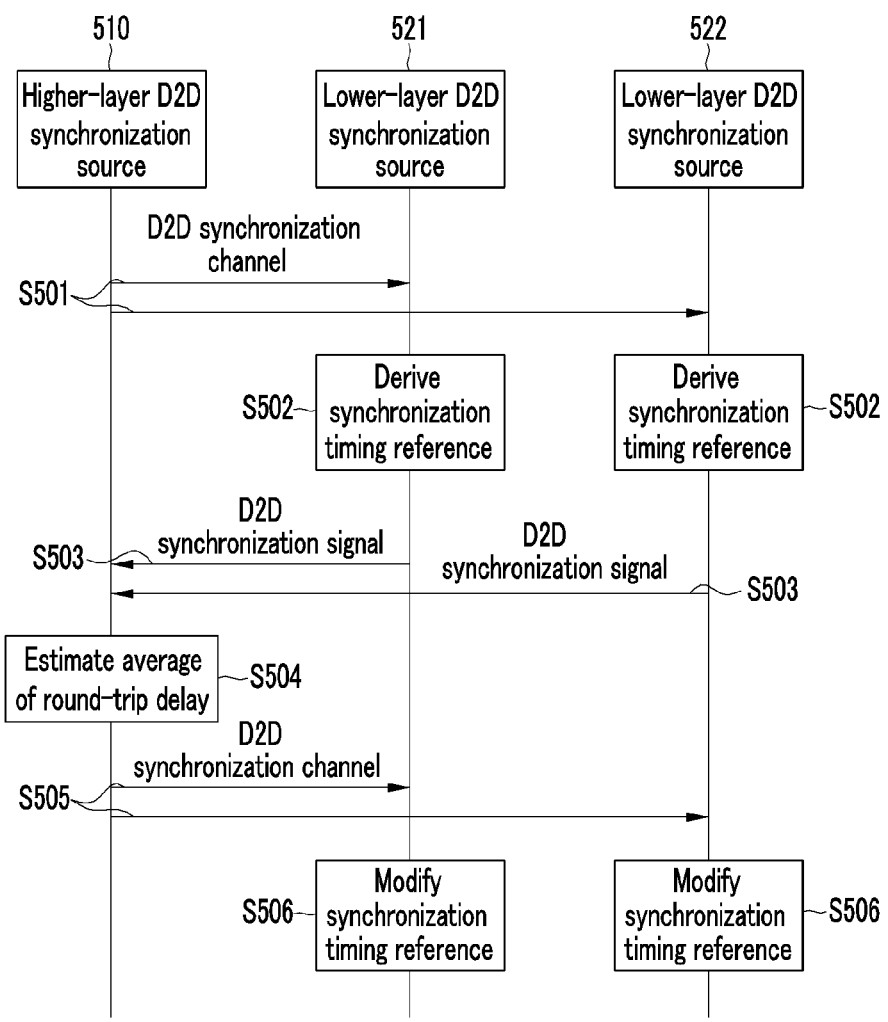
FIG. 5 is a flowchart illustrating a method for measuring delay information according to the exemplary embodiment of the present invention.

FIG. 5 is a flowchart illustrating a method for measuring delay information according to the exemplary embodiment of the present invention.

The delay information included in the synchronization channel according to the exemplary embodiment of the present invention may be pre-configured in the D2D terminal or directly configured by the base station by applying information such as the transmission strength of the D2D synchronization signal and the coverage of the D2D synchronization source. When the delay information is configured by the base station, the base station may provide the delay information to the D2D synchronization source through a system information block (SIB) message or a radio resource control (RRC) message. When the delay information is not configured by the base station or when a term of validity of the delay information configured by the base station expires, the D2D synchronization source brings the delay information pre-configured by considering the transmission strength of the D2D synchronization signal. The D2D synchronization source may reflect the delay information pre-configured in the terminal or configured by the base station to the D2D synchronization channel and transmit the delay information.

According to another exemplary embodiment of the present invention, the delay information may be configured through calculation of a path loss. The D2D synchronization source may transmit the D2D synchronization channel including information (hereinafter referred to as 'reference strength information') regarding a reference strength of the D2D synchronization signal transmitted thereby. Since the quantity of data which may be transmitted through the D2D synchronization channel is limited, the D2D synchronization source may select one of a plurality of possible reference strength information that represent reference strengths which may be used as the reference strength of the D2D synchronization signal. The reference strength of the D2D synchronization signal may vary depending on a situation (inside/outside the coverage of the base station, the public safety, the number of contiguous D2D synchronization sources capable of receiving the D2D synchronization signal, and the like) of the D2D synchronization source transmitting the D2D synchronization signal. Accordingly, the reference strength of the D2D synchronization signal which may be selected by the D2D synchronization source may be configured or pre-configured by the base station or incorporated. A method for configuring the delay information through the calculation of the path loss is described below.

First, the D2D synchronization source transmits the provided synchronization timing reference or the synchronization timing reference generated thereby. In this case, the reference strength information of the D2D synchronization signal included in the D2D synchronization channel may be selected according to the transmission strength of the synchronization signal and a default value is stored as the delay information.

Thereafter, among D2D terminals that receive the D2D synchronization signal and the D2D synchronization channel, a terminal (that is, the D2D synchronization source of the lower layer) that will operate as the relaying synchronization source applies the received synchronization timing reference and broadcasts the D2D synchronization signal and the D2D synchronization channel. In this case, the D2D synchronization source of the lower layer that transmits the D2D synchronization signal and the D2D synchronization channel applies the reference strength information included in the D2D synchronization channel received from the D2D synchronization source (the independent synchronization source or the relaying synchronization source of the higher layer) of the higher layer to broadcast the D2D synchronization signal and the D2D synchronization channel.

The independent synchronization source or the relaying synchronization source of the higher layer that receives the D2D synchronization signal and the D2D synchronization channel from the relaying synchronization source of the lower layer calculates the path loss based on the reception strength of the D2D synchronization signal and the reference strength information of the D2D synchronization signal provided through the D2D synchronization channel to configure the delay information. Thereafter, the independent synchronization source or the relaying synchronization source of the higher layer reflects the configured delay information to the D2D synchronization channel and transmits the D2D synchronization signal and the D2D synchronization channel.

The synchronization source of the lower layer, which receives the D2D synchronization channel including the delay information from the independent synchronization source or the relaying synchronization source of the higher layer, reflects the delay information to adjust the synchronization timing reference.

According to another exemplary embodiment of the present invention, the delay information may be configured through a hand-shake method. In the hand-shake method, one or a plurality of D2D synchronization sources which receive the synchronization timing reference directly from the same D2D independent synchronization source or through the relaying synchronization source and to which the reference is applied operate as the same group, and each D2D synchronization source may verify a group to which each D2D synchronization source belongs. For example, the D2D synchronization source having the same synchronization timing reference may use the same D2D synchronization signal, use the D2D synchronization signal distinguished into the group, or verify a group to which the D2D synchronization source belongs through a group identifier included in the D2D synchronization channel. The D2D synchronization source of the higher layer according to the exemplary embodiment of the present invention transmits and receives the D2D synchronization signal and the D2D synchronization channel to and from the D2D synchronization source of the lower layer to measure a round-trip delay (RTD) and configure the delay information based on the measured round-trip delay (RTD). The method for configuring the delay information through the hand-shake may be applied according to a predetermined cycle, and in this case, as the applied cycle, a measurement cycle for the D2D synchronization signal of the D2D terminal and power consumption of the D2D terminal may be considered.

According to another exemplary embodiment of the present invention, a method for configuring the delay information through the hand-shake between the terminals when the same D2D synchronization signal is used is described.

First, the D2D synchronization source broadcasts the provided synchronization timing reference or the synchronization timing reference generated thereby. In this case, the delay information included in the D2D synchronization channel may be configured as the default value.

Among D2D terminals that receive the D2D synchronization signal and the D2D synchronization channel, a terminal (that is, the D2D synchronization source of the lower layer) that will operate as the relaying synchronization source applies the received synchronization timing reference and selects the signal (that is, the same sequence) as the received D2D synchronization signal. In addition, the relaying synchronization source broadcasts the selected D2D synchronization signal and D2D synchronization channel. In this case, the D2D synchronization signal and the D2D synchronization channel may be transmitted through at least one resource pool as described above.

The D2D synchronization source of the higher layer searches the D2D synchronization signal provided from the D2D synchronization source of the lower layer among the D2D synchronization signal and the D2D synchronization channel received from the contiguous D2D synchronization source and decodes the D2D synchronization signal of the D2D synchronization source of the lower layer and obtains the synchronization timing reference. In addition, the D2D synchronization source of the higher layer may calculate the round-trip delay based on the obtained synchronization timing reference and reflect the calculated round-trip delay to the delay information to be included in the D2D synchronization channel thereof. In this case, when the D2D synchronization source of the higher layer receives the D2D synchronization signal from the plurality of D2D synchronization sources of the lower layer and calculates a plurality of round-trip delays, the D2D synchronization source of the higher layer may calculate an average value of the plurality of round-trip delays and reflect the average value of the plurality of round-trip delays to the D2D synchronization channel.

Thereafter, the D2D synchronization source of the lower layer, which receives the D2D synchronization signal and the D2D synchronization channel from the D2D synchronization source of the higher layer, may adjust the synchronization timing reference based on the delay information to which the round-trip delay is reflected.

According to another exemplary embodiment of the present invention, a method for configuring the delay information through the hand-shake between the terminals when the D2D synchronization signal is used for each group or information (e.g., a group index and the like) regarding the group is included in the D2D synchronization channel is described.

When the D2D synchronization signal is distinguished for each group, one group includes some of sequences which may be used as the D2D synchronization signal. Therefore, the terminal that receives the D2D synchronization signal may know to which group the corresponding synchronization reference belongs through the sequence of the D2D synchronization signal. When the respective groups are not distinguished by the D2D synchronization signal, the D2D synchronization source makes the information (e.g., the group index) regarding the group be included in the D2D synchronization channel to provide information regarding to which group the corresponding synchronization reference belongs.

First, the D2D synchronization source transmits the provided synchronization timing reference or the synchronization timing reference generated thereby. In this case, the delay information included in the D2D synchronization channel may be configured as the default value.

Among D2D terminals that receive the D2D synchronization signal and the D2D synchronization channel transmitted from another D2D synchronization source, a terminal (that is, the D2D synchronization source of the lower layer) that will operate as the relaying synchronization source applies the received synchronization timing reference. In addition, the D2D synchronization source of the lower layer selects one among the sequences which may be used as the D2D synchronization signal in the corresponding group as the synchronization signal when the D2D synchronization signal distinguished for each group is used, and when the D2D synchronization signal is distinguished by the group index included in the D2D synchronization channel, the D2D synchronization source of the lower layer makes the corresponding group index be included in the D2D synchronization channel. In this case, the D2D synchronization signal and the D2D synchronization channel may be transmitted through at least one resource pool as described above.

The D2D synchronization source of the higher layer may decode the D2D synchronization signal provided by the D2D synchronization source of the lower layer between the D2D synchronization signal and the D2D synchronization channel received from the contiguous D2D synchronization source and obtain the synchronization timing reference. In addition, the D2D synchronization source of the higher layer may calculate the round-trip delay based on the obtained synchronization timing reference and reflect the calculated round-trip delay to the delay information to be included in the D2D synchronization channel. In this case, when the D2D synchronization source of the higher layer receives the D2D synchronization signal from the plurality of D2D synchronization sources of the lower layer and calculates a plurality of round-trip delays, the D2D synchronization source of the higher layer may reflect the average value of the plurality of round-trip delays to the delay information.

Thereafter, the D2D synchronization source of the lower layer, which receives the D2D synchronization signal and the D2D synchronization channel from the D2D synchronization source of the higher layer, may adjust the synchronization timing reference based on the delay information included in the D2D synchronization channel.

Referring to FIG. 5, first, the D2D synchronization source 510 of the higher layer broadcasts the D2D synchronization signal (S501). The relaying synchronization sources 521 and 522 that receive the D2D synchronization signal from the D2D synchronization source 510 of the higher layer derives the synchronization timing reference (alternatively, reference timing) of the D2D synchronization source 510 of the higher layer (S502), and generates the D2D synchronization signal based on the estimated reference timing and broadcasts the generated D2D synchronization signal (S503).

The D2D synchronization source 510 of the higher layer that receives the D2D synchronization signal broadcasted from the D2D synchronization sources 521 and 522 of the lower layer estimates the average of the round-trip delays (average RTD) (S504) and makes the delay information configured based on the average RTD be included in the D2D synchronization channel to transmit the D2D synchronization channel (S505).

The D2D synchronization sources 521 and 522 of the lower layer that receive the D2D synchronization channel from the D2D synchronization source 510 of the higher layer may modify the synchronization timing reference based on the delay information of the D2D synchronization channel (S506).

Figure 6:
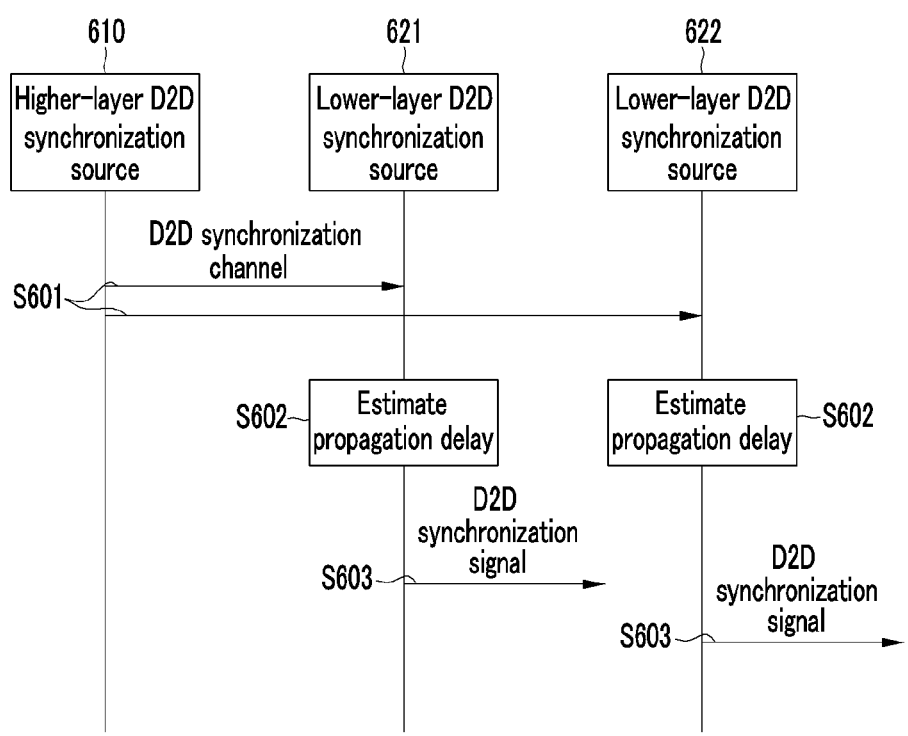
FIG. 6 is a flowchart illustrating a method for transmitting a synchronization signal according to another exemplary embodiment of the present invention.

FIG. 6 is a flowchart illustrating a method for transmitting a synchronization signal according to another exemplary embodiment of the present invention.

Referring to FIG. 6, the D2D synchronization source may estimate a delay based on the reception strength of the received D2D synchronization signal and the synchronization timing reference may be adjusted based on the time length of the estimated delay. That is, when a D2D synchronization source 610 of the higher layer transmits the D2D synchronization signal (S601), D2D synchronization sources 621 and 622 of the lower layer may estimate a propagation delay based on the reception strength of the received D2D synchronization signal, and adjust the synchronization timing reference provided through the D2D synchronization signal based on the estimated propagation delay (S602).

In this case, the propagation delay may be estimated based on a table in which the strength of the received signal and the propagation delay value depending on the strength of the received signal are defined or estimated from the strength of the received signal utilizing a predetermined algorithm.

According to the exemplary embodiment of the present invention, in order to more deliberately estimate the propagation delay, the D2D synchronization source may make the reference strength information of the D2D synchronization signal transmitted thereby be included in the D2D synchronization channel. In this case, since the quantity of data which may be transmitted through the D2D synchronization channel is limited, the D2D synchronization source selects one of a plurality of reference strength options to transmit the D2D synchronization signal to the selected one. The transmit power of the D2D synchronization signal may vary depending on a situation (inside/outside the coverage of the base station, the public safety, the number of contiguous D2D synchronization sources capable of receiving the D2D synchronization signal, and the like) of the D2D synchronization source transmitting the D2D synchronization signal. Accordingly, the plurality of reference strength options which may be selected by the D2D synchronization source may be configured or pre-configured by the base station. A D2D reception terminal (alternatively, relaying synchronization source) that receives the D2D synchronization channel including the reference strength information and the D2D synchronization signal transmitted at the reference strength compares the reference strength information included in the D2D synchronization channel and the reception strength of the D2D synchronization signal to calculate the path loss and estimate the amount of misalignment in the reference timing caused by the propagation delay based on the calculated path loss value. In addition, the D2D reception terminal (alternatively, relaying synchronization source) that receives the D2D synchronization signal may adjust the synchronization timing reference based on the estimated time error.

Meanwhile, when the transmit power of the D2D synchronization signal is pre-configured by the base station and the like so that the D2D synchronization signal is transmitted at a predetermined transmit power regardless of a situation of a D2D group or the like (that is, when the transmit power pre-configured by the D2D synchronization source and the D2D reception terminal is known), a bit for the reference strength information of the D2D synchronization signal may not be used in the D2D synchronization channel and the bit may be used to additionally provide another information.

Thereafter, the D2D synchronization sources 621 and 622 of the lower layer broadcast the D2D synchronization signal to provide the adjusted synchronization timing reference to the contiguous D2D terminal (S603).

In the exemplary embodiment of the present invention, the delay information included in the D2D synchronization channel may prevent a synchronization timing error from being generated due to a propagation delay accumulated in the D2D terminal or the relaying synchronization source when the D2D synchronization source provides the D2D synchronization signal and the synchronization timing reference through the D2D synchronization channel, and prevent interference such as inter-symbol interference (ISI) and inter-carrier interference (ICI) or collision due to the time error. In this case, the delay information may be more effective when being applied to the D2D terminal or the relaying synchronization source which is located at a point away enough from the D2D synchronization source for sufficient amount of the propagation delay to occur rather than being applied to the D2D terminal or the relaying synchronization source which is located relatively close to the D2D synchronization source. In addition, in order to efficiently use the delay information according to the exemplary embodiment of the present invention, the D2D synchronization source may transmit additional information (hereinafter referred to as 'additional information') which may determine whether to use the delay information in addition to the delay information through the D2D synchronization channel.

In the exemplary embodiment of the present invention, the additional information may provide a reference which may determine whether to use the delay information through reception strength of the received D2D synchronization signal provided by the D2D synchronization source. That is, the D2D synchronization source may transmit the target received signal strength at the D2D reception terminal as the additional information through the D2D synchronization channel. When information on the signal strength at the D2D reception terminal is referred to as strength information Y (having the unit of dB or dBm) of the received signal, the D2D reception terminal or the relaying synchronization source may adjust a synchronization reference time by using the delay information included in the D2D synchronization channel when the reception strength of the D2D synchronization signal is smaller than Y. In this case, the received signal strength information Y may be configured by considering the transmit power of the D2D synchronization signal transmitted from the D2D synchronization source, whether to use a normal CP or an extended CP, whether a contiguous D2D synchronization source exists, and the like.

According to the exemplary embodiment of the present invention, the additional information may be used in a D2D synchronization source or a D2D terminal of a lower layer as follows. First, the D2D synchronization source of the higher layer transmits the delay information and the additional information by considering the transmit power of the D2D synchronization signal to be transmitted, a length of the CP, and the like. The D2D synchronization source of the lower layer which receives the D2D synchronization channel compares the reception strength of the received D2D synchronization signal with the strength value of the signal provided through the additional information. When the reception strength of the received D2D synchronization signal is smaller than the strength value of the signal provided through the additional information, the D2D synchronization source of the lower layer may adjust a synchronization timing reference itself by applying the provided delay information.

Figure 7:
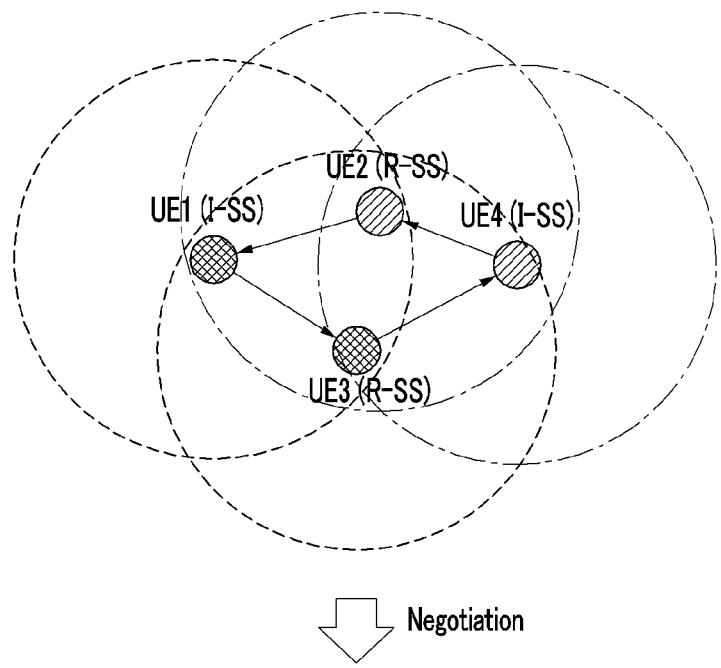
FIG. 7 is a conceptual diagram illustrating a negotiation method between synchronization sources according to an exemplary embodiment of the present invention.
Figure 7:
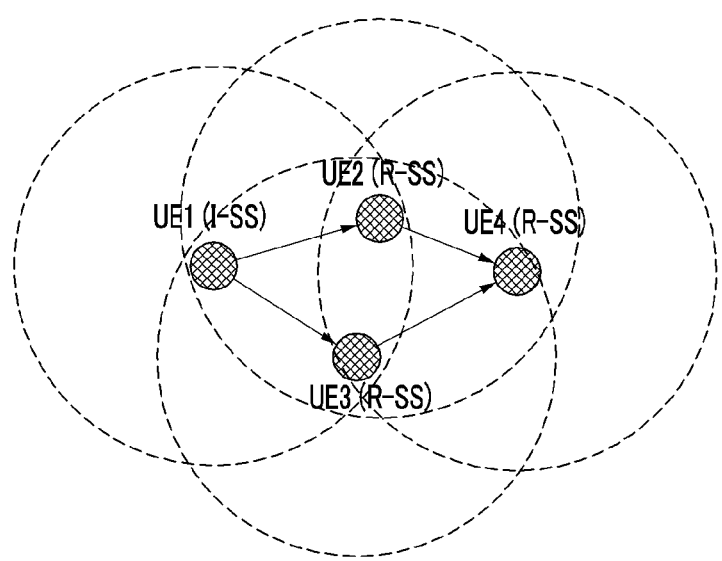
Figure 8:
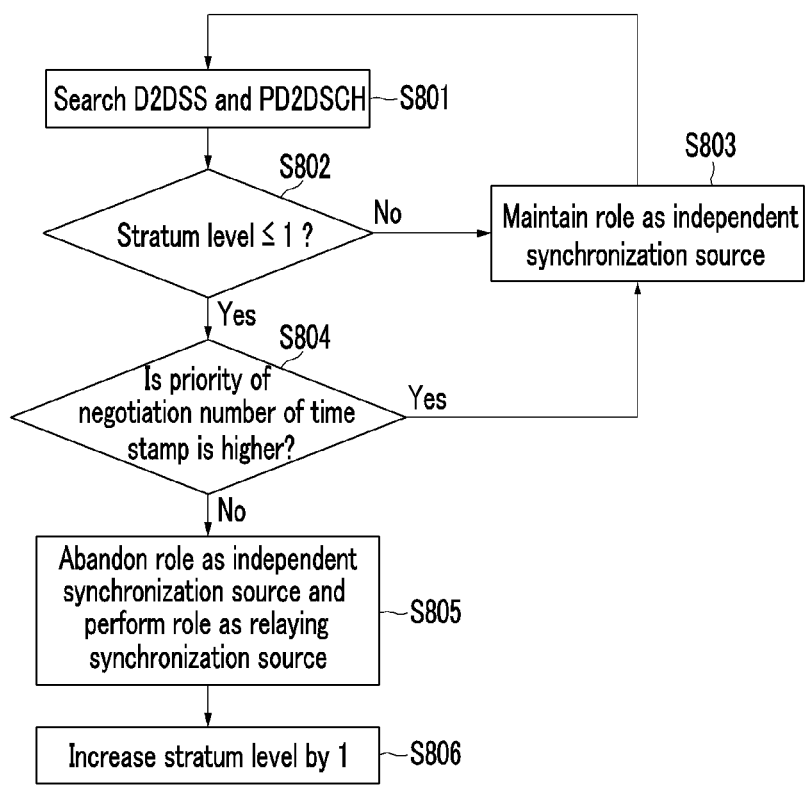
FIG. 8 is a flowchart illustrating a negotiation method between synchronization sources according to the exemplary embodiment of the present invention.

FIG. 7 is a conceptual diagram illustrating a negotiation method between synchronization sources according to an exemplary embodiment of the present invention, and FIG. 8 is a flowchart illustrating a negotiation method between synchronization sources according to the exemplary embodiment of the present invention.

In a synchronization procedure of the D2D terminal using a hierarchical structure, since a plurality of different independent synchronization sources exist, different synchronization timing references may be provided to one D2D terminal. When a plurality of different synchronization timing references exist in the plurality of independent synchronization sources, battery consumption and operation complexity of the D2D terminal tracking the synchronization are increased, and in terms of the entire D2D network, synchronization performance may also deteriorate. Accordingly, in order to synchronize the D2D terminal using the hierarchical structure, the respective independent synchronization sources need to negotiate with each other in order to reduce the number of independent synchronization sources.

In the exemplary embodiment of the present invention, when one independent synchronization source receives the D2D synchronization signal and the D2D synchronization channel from one contiguous independent synchronization source or a relaying synchronization source of which a stratum level is 1 (that is, a synchronization source which is received through the D2D synchronization signal and the synchronization channel in which the independent synchronization source directly broadcasts the synchronization timing reference of the independent synchronization source), each independent synchronization source maintains or discards the synchronization source role itself to reduce the number of independent synchronization source. In this case, in each independent synchronization source, proper negotiation information for negotiation may be provided. The independent synchronization source or the relaying synchronization source of which the stratum level is 1 according to the exemplary embodiment of the present invention may provide information for negotiation between synchronization sources (hereinafter referred to as 'negotiation information') to the D2D synchronization channel through the D2D synchronization source.

The negotiation information may be configured through two methods below. First, according to a first method, when one D2D terminal selects a role as the independent synchronization source, the D2D terminal may randomly select a negotiation number for negotiation between the independent synchronization sources. In this case, the negotiation number may be determined as a bitstream having a predetermined length. The independent synchronization source selecting the negotiation number may include a negotiation number in the D2D synchronization channel itself.

Next, according to a second method, the independent synchronization source may transmit a time stamp representing a time operating as the independent synchronization source through the D2D synchronization channel. In this case, time stamp information may be an integer increasing according to a predetermined time interval or an integer meaning a time which starts to operate as the independent synchronization source.

Thereafter, the D2D synchronization source of the lower layer which receives the negotiation information from the independent synchronization source transmits negotiation information through the D2D synchronization signal or the D2D synchronization channel. Accordingly, when the independent synchronization source or the relaying synchronization source of which the stratum level is 1 is positioned at a contiguous place, the independent synchronization source may receive negotiation information by receiving the D2D synchronization signal and the D2D synchronization channel. Referring to FIG. 7, a UE4 operating as the independent synchronization source performs the role as the delaying synchronization source changed after negotiation.

Referring to FIG. 8, first, the independent synchronization source according to the exemplary embodiment of the present invention searches the D2D synchronization signal and the D2D synchronization channel which are received from the contiguous D2D synchronization source. In addition, the independent synchronization source determines whether the D2D synchronization source broadcasting the D2D synchronization signal and the D2D synchronization channel is the independent synchronization source or the relaying synchronization source of which stratum level is 1 (S802). For example, the independent synchronization source may determine a stratum level of the D2D synchronization source broadcasting the D2D synchronization channel, through the information on the stratum level included in the D2D synchronization channel. When the D2D synchronization source broadcasting the received D2D synchronization signal and the D2D synchronization channel is not the independent synchronization source or the relaying synchronization source of which stratum level is 1 (that is, the stratum level is 2 or more), the independent synchronization source maintains a role as the independent synchronization source (S803).

However, when the D2D synchronization source broadcasting the received D2D synchronization signal and the D2D synchronization channel is the independent synchronization source or the relaying synchronization source of which stratum level is 1 (that is, the stratum level of the D2D synchronization channel is 0 or 1), the independent synchronization source compares a negotiation number or time stamp itself with the negotiation number or time stamp included in the D2D synchronization channel (S804). When the compared result indicates that the priority of the negotiation number itself is equal to or higher than priority of the negotiation number of the D2D synchronization source, the independent synchronization source maintains a role as the independent synchronization source. Alternatively, When the compared result indicates that a time represented in the time stamp itself is relatively larger than a time represented in the time stamp provided to the D2D synchronization channel of the contiguous D2D synchronization source, the independent synchronization source maintains a role as the independent synchronization source.

However, when the priority of the negotiation number or time stamp itself is lower than that of the contiguous D2D synchronization source, the independent synchronization source gives up the role as the independent synchronization source (that is, stops the operation as the independent synchronization source), and synchronizes the independent synchronization source itself with the synchronization timing reference of the contiguous D2D synchronization source (S805). Thereafter, the D2D synchronization source which gives up the role as the independent synchronization source increases a stratum level by 1 and broadcasts the D2D synchronization signal and the D2D synchronization channel based on the modified synchronization timing reference.

As described above, according to the embodiment of the present invention, the D2D terminal may perform synchronization with the contiguous D2D terminal through the hierarchical structure without control by the base station outside the coverage of the base station. In this case, the D2D terminal according to the exemplary embodiment of the present invention may avoid the signal collision or signal interference depending on the propagation delay by adjusting the synchronization timing reference. Further, the D2D terminal appropriately controls the number of independent synchronization sources through negotiation with another synchronization source to solve a problem of an increase in battery consumption and calculation complexity of the D2D terminal.

Figure 9:
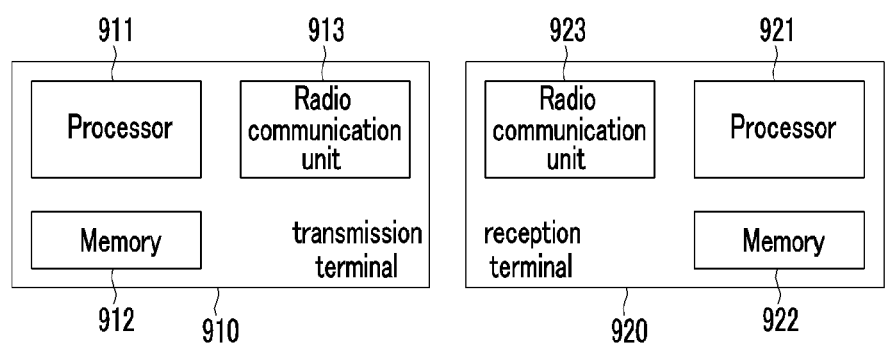
FIG. 9 is a block diagram illustrating a wireless communication system according to an exemplary embodiment of the present invention.

FIG. 9 is a block diagram illustrating a wireless communication system according to an exemplary embodiment of the present invention.

Referring to FIG. 9, the wireless communication system according to the exemplary embodiment of the present invention includes a transmission terminal 910 and a reception terminal 920.

The transmission terminal 910 includes a processor 911, a memory 912, and a radio frequency (RF) unit 913. The memory 912 is connected with the processor 911 to store various pieces of information for driving the processor 911. The RF unit 913 is connected with the processor 911 to transmit and/or receive a radio signal. The processor 911 may implement a function, a process, and/or a method which are proposed in the exemplary embodiment of the present invention. In this case, in the wireless communication system according to the exemplary embodiment of the present invention, the radio interface protocol layer may be implemented by the processor 911. An operation of the transmission terminal 910 according to the exemplary embodiment of the present invention may be implemented by the processor 911.

The reception terminal 920 includes a processor 921, a memory 922, and an RF unit 923. The memory 922 is connected with the processor 921 to store various pieces of information for driving the processor 921. The RF unit 923 is connected with the processor 921 to transmit and/or receive the radio signal. The processor 921 may implement the function, the process, and/or the method which are proposed in the exemplary embodiment of the present invention. In this case, in the wireless communication system according to the exemplary embodiment of the present invention, the radio interface protocol layer may be implemented by the processor 921. An operation of the transmission terminal 920 according to the exemplary embodiment of the present invention may be implemented by the processor 921.

In the exemplary embodiment of the present invention, the memory may be positioned inside or outside the processor, and the memory may be connected with the processor through various already known means. The memory is various types of volatile or non-volatile storage media, and the memory may include, for example, a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for synchronization source negotiation by an independent synchronization source included in a device to device (D2D) communication network, the method comprising:

determining, when a D2D synchronization signal and a D2D synchronization channel are received from at least one D2D synchronization source, whether to maintain a role as the independent synchronization source based on negotiation information for negotiation between synchronization sources included in the D2D synchronization channel; and operating as a relaying synchronization source when the role as the independent synchronization source is not maintained;

wherein the negotiation information includes a time stamp indicating a period when the independent synchronization source operates as the independent synchronization source, and the determining includes:

comparing the time stamp indicating the period when the independent synchronization source operates as the independent synchronization source, and a time stamp of at least one D2D synchronization source; and determining whether to maintain the role as the independent synchronization source based on a comparison result.

2. The method for synchronization source negotiation of claim 1, wherein the negotiation information includes a negotiation number which the independent synchronization source determines when selecting the role as the independent synchronization source.

3. The method for synchronization source negotiation of claim 2, wherein the determining includes: comparing the negotiation number of the independent synchronization source and a negotiation number of at least one D2D synchronization source; and determining whether to maintain the role as the independent synchronization source based on the comparison result.

4. The method for synchronization source negotiation of claim 1, further comprising increasing a stratum level by 1 when the role as the independent synchronization source is not maintained.

5. The method for synchronization source negotiation of claim 1, wherein the determining includes: verifying a stratum level of the at least one D2D synchronization source; and determining whether to maintain the role as the independent synchronization source when the stratum level of the at least one D2D synchronization source is 0 or 1.

6. The method for synchronization source negotiation of claim 5, wherein the determining further includes maintaining the role as the independent synchronization source when the stratum level of the at least one D2D synchronization source is 2 or more.

7. A method for synchronization source negotiation by an independent synchronization source included in a device to device (D2D) communication network, the method comprising:

determining, when a D2D synchronization signal and a D2D synchronization channel are received from at least one D2D synchronization source, whether to maintain a role as the independent synchronization source based on negotiation information for negotiation between synchronization sources included in the D2D synchronization channel; and operating as a relaying synchronization source when the role as the independent synchronization source is not maintained, wherein the negotiation information includes a negotiation number which the independent synchronization source determines when selecting the role as the independent synchronization source, and the determining includes:

comparing the negotiation number of the independent synchronization source and a negotiation number of at least one D2D synchronization source; and determining whether to maintain the role as the independent synchronization source based on a comparison result.

* * * * *